United States Patent
Lathrop et al.

(10) Patent No.: US 9,276,408 B2
(45) Date of Patent: Mar. 1, 2016

(54) AUTOMATIC TRANSFER SWITCH RESPONSIVE TO SERIAL COMMUNICATION MESSAGE AND POWER SYSTEM INCLUDING THE SAME

(75) Inventors: Todd M. Lathrop, Oakdale, PA (US); Dhananjay Lal, Seven Fields, PA (US)

(73) Assignee: EATON CORPORATION, Cleveland, OH (US)

(*) Notice: Subject to any disclaimer, the term of this patent is extended or adjusted under 35 U.S.C. 154(b) by 1279 days.

(21) Appl. No.: 12/915,265

(22) Filed: Oct. 29, 2010

(65) Prior Publication Data
US 2012/0104848 A1 May 3, 2012

(51) Int. Cl.
H02J 3/38 (2006.01)
H02J 9/06 (2006.01)

(52) U.S. Cl.
CPC ............. *H02J 3/381* (2013.01); *H02J 9/061* (2013.01); *Y02B 10/72* (2013.01); *Y10T 307/391* (2015.04)

(58) Field of Classification Search
CPC ................................. H02J 3/381; Y02B 10/72
USPC .................. 307/29, 64, 66; 370/389; 700/297
See application file for complete search history.

(56) References Cited

U.S. PATENT DOCUMENTS

| | | | |
|---|---|---|---|
| 4,747,061 A | 5/1988 | Lagree et al. | |
| 4,894,796 A | 1/1990 | Engel et al. | |
| 5,210,685 A | 5/1993 | Rosa | |
| 5,397,868 A | 3/1995 | Smith et al. | |
| 5,638,295 A * | 6/1997 | Lagree et al. | 700/297 |
| 6,849,967 B2 | 2/2005 | Lathrop et al. | |
| 7,239,045 B2 | 7/2007 | Lathrop et al. | |
| 7,569,949 B2 | 8/2009 | Lathrop et al. | |
| 8,412,387 B2 * | 4/2013 | Park et al. | 700/297 |
| 2003/0075982 A1 * | 4/2003 | Seefeldt | 307/29 |
| 2004/0076148 A1 * | 4/2004 | Ferry et al. | 370/389 |
| 2006/0221533 A1 * | 10/2006 | Lathrop et al. | 361/160 |
| 2007/0063866 A1 * | 3/2007 | Webb | 340/870.02 |
| 2010/0218108 A1 * | 8/2010 | Crabtree et al. | 715/738 |

OTHER PUBLICATIONS

Wikimedia Foundation, Inc., Wikipedia, the free encyclopedia, "Smart grid", http://en.wikipedia.org/wiki/Smart_grid, Jul. 24, 2010, 19 pp.
U.S. Department of Energy, "Advanced Control Methods, Appendix B4: A Systems View of the Modern Grid", Mar. 2007, 22 pp.
U.S. Department of Energy, "Integrated Communications, Appendix B1: A Systems View of the Modern Grid", Feb. 2007, 20 pp.
U.S. Department of Energy, "A Compendium of Smart Grid Technologies, NETL Modern Grid Strategy Powering our 21st-Century Economy", Jul. 2009, 46 pp.
U.S. Department of Energy, "The Smart Grid: An Introduction", 2008, 48 pp.

* cited by examiner

*Primary Examiner* — Rexford Barnie
*Assistant Examiner* — Toan Vu
(74) *Attorney, Agent, or Firm* — Eckert Seamans Cherin & Mellott, LLC; Philip E. Levy; Grant E. Coffield

(57) ABSTRACT

A power system includes a first power source, a second power source, an automatic transfer switch, and a number of loads powered by an output of the automatic transfer switch. The automatic transfer switch includes a first input structured to receive power from the first power source, a second input structured to receive power from the second power source, the output, a transfer mechanism structured to electrically connect only one of the first input and the second input to the output, and a receiver structured to receive a serial communication message and cause the transfer mechanism to electrically connect only the second input to the output.

18 Claims, 5 Drawing Sheets

AUTOMATIC TRANSFER SWITCH RESPONSIVE TO SERIAL COMMUNICATION MESSAGE AND POWER SYSTEM INCLUDING THE SAME

BACKGROUND

1. Field

The disclosed concept pertains generally to power systems and, more particularly, to such power systems including an automatic transfer switch. The disclosed concept also pertains to automatic transfer switches for powering a number of loads from one of two power sources.

2. Background Information

In connection with a "smart grid", the U.S. Department of Energy discloses that the electric grid delivers electricity from points of generation to consumers, and the electricity delivery network functions via two primary systems: the transmission system and the distribution system. The transmission system delivers electricity from power plants to distribution substations, while the distribution system delivers electricity from distribution substations to consumers. The grid also encompasses myriads of local area (power) networks that use distributed energy resources to serve local loads and/or to meet specific application requirements for remote power, village or district power, premium power, and critical loads protection.

By enabling consumers to automatically reduce demand for brief periods through new technologies and motivating mechanisms like real-time pricing, the grid remains reliable—and consumers are compensated for their help. Enabling consumer participation also provides tangible results for utilities which are experiencing difficulty in siting new transmission lines and power plants. Ultimately, tapping the collaborative power of millions of consumers to shed loads will put significant brakes on the need for new infrastructure at any cost.

Load shedding can be done by individual utilities to ensure that those customers that are paying the most for power are getting power. This can be accomplished by a system that can remove individual, relatively large residential loads during peak electrical usage times. These loads can be, but are not limited to, air conditioners, water pumps and heating elements. However, this can leave the individual home owner without the ability to utilize the loads that they have, when they want or need them. The possibility for increased electrical invoices during these peak times is warranted if the utility is not allowed to control the loads.

It is known to use the "smart grid" to control individual loads. The loads can be automatically switched "off" at any time during a specific period of time.

It is also known to use a smart meter, smart controller and/or smart circuit breakers to control individual loads or circuits.

There is room for improvement in power systems.

There is also room for improvement in automatic transfer switches.

SUMMARY

These needs and others are met by embodiments of the disclosed concept, which provide an automatic transfer switch comprising a transfer mechanism structured to electrically connect only one of a first input and a second input to an output, and a receiver structured to receive a serial communication message and cause the transfer mechanism to electrically connect only the second input to the output.

In accordance with one aspect of the disclosed concept, a power system comprises: a first power source; a second power source; an automatic transfer switch comprising: a first input structured to receive power from the first power source, a second input structured to receive power from the second power source, an output, a transfer mechanism structured to electrically connect only one of the first input and the second input to the output, and a receiver structured to receive a serial communication message and cause the transfer mechanism to electrically connect only the second input to the output; and a number of loads powered by the output.

The serial communication message may be a load shed message; and the receiver may be further structured to receive a reapply message and cause the transfer mechanism to electrically connect only the first input to the output.

The first power source may comprise a server and a meter including a processor; the processor may be structured to communicate with the server; and the processor may be further structured to wirelessly communicate with the receiver.

The output of the automatic transfer switch may comprise a sub-panel for a plurality of non-essential loads powered by the second power source when the receiver receives the serial communication message and causes the transfer mechanism to electrically connect only the second input to the output.

The second power source may be a standby generator; the first power source may comprise a server; the serial communication message may be a load shed message; the receiver may be structured to receive the load shed message from the server and responsively start the standby generator; and the receiver may be further structured to receive a reapply message from the server, responsively stop the standby generator and cause the transfer mechanism to electrically connect only the first input to the output.

The first power source may comprise a server; and the serial communication message may be a demand response load control message from the server.

The server may be structured to communicate with the receiver by employing one of an AMI network and a non-AMI network.

As another aspect of the disclosed concept, an automatic transfer switch may comprise: a first input structured to receive power from a first power source; a second input structured to receive power from a second power source; an output structured to power a number of loads; a transfer mechanism structured to electrically connect only one of the first input and the second input to the output; and a receiver structured to receive a serial communication message and cause the transfer mechanism to electrically connect only the second input to the output.

As another aspect of the disclosed concept, a power system comprises: a processor comprising a receiver structured to receive a serial communication message and a transmitter structured to transmit the serial communication message; and an automatic transfer switch comprising: a first input structured to receive power from a first power source, a second input structured to receive power from a second power source, an output structured to power a number of loads, a transfer mechanism structured to electrically connect only one of the first input and the second input to the output, and a receiver structured to receive the serial communication message from the transmitter of the processor and cause the transfer mechanism to electrically connect only the second input to the output.

The serial communication message may be an objective based message affecting a portion of power consumed by the number of loads; and the processor may comprise a rule engine employing user-specified load profiles and being structured to identify a number of the number of loads to disable and may further control a number of remote controlled circuit breakers structured to selectively disable the number of loads.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a controller; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "serial communication" shall mean a process of sending a plurality of bits of data one bit at a time, sequentially, by employing wired or wireless communication.

Figure 1:
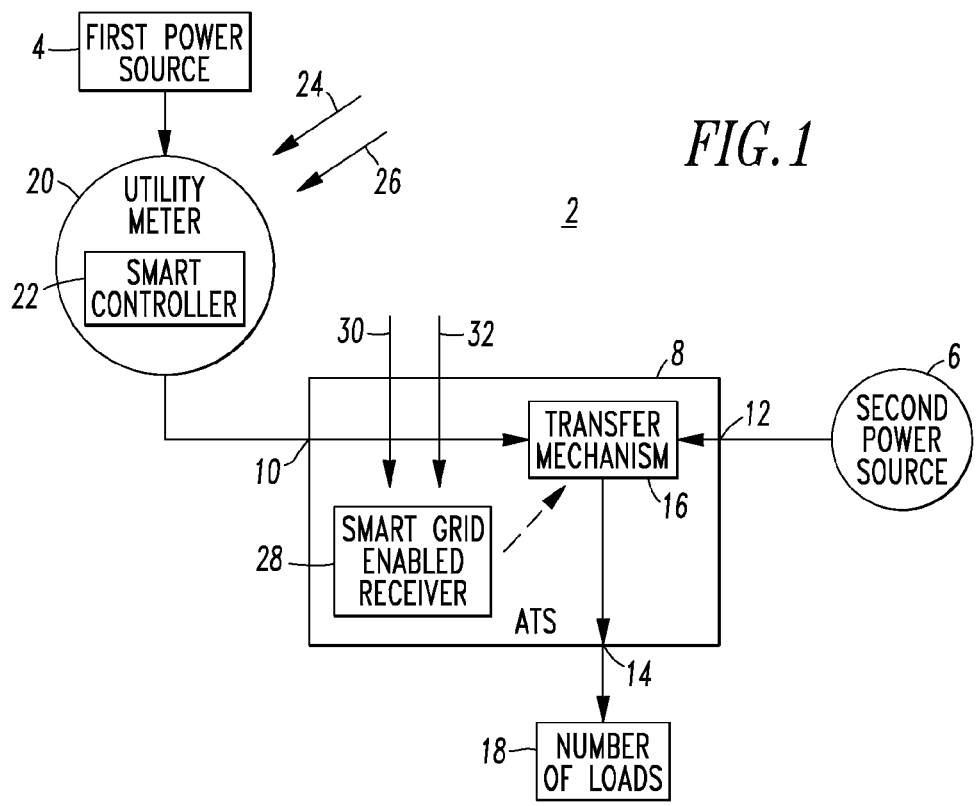
FIGS. 1-8 are block diagrams in schematic form of power systems in accordance with embodiments of the disclosed concept.

Referring to FIG. 1, a power system, such as the example smart power system 2, includes a first power source 4 (e.g., without limitation, a utility power source; a utility enterprise comprising a power source), a second power source 6 (e.g., without limitation, an alternate power source; a generator, an uninterruptable power source (UPS); a solar power source; a wind power source, such as a wind turbine), and an automatic transfer switch (ATS) 8. The ATS 8 includes a first input 10 structured to receive power from the first power source 4, a second input 12 structured to receive power from the second power source 6, an output 14, a transfer mechanism 16 structured to electrically connect only one of the first input 10 and the second input 12 to the output 14, and a receiver, such as the example smart grid enabled receiver 28, structured to receive a serial communication message (e.g., without limitation, a load shed message; a pricing signal) and cause the transfer mechanism 16 to electrically connect only the second input 12 to the output 14. A number of loads 18 are powered by the output 14. The number of loads 18 can be, for example and without limitation, a whole house, an office or a residence, or a selected number of loads where, for example, a sub-panel (not shown in FIG. 1) is employed to separate non-essential loads from essential loads.

A meter, such as the example utility meter 20, includes a processor, such as the example controller or smart controller 22, structured to communicate using serial communication messages 24,26 (e.g., without limitation, wireless serial communication messages using Zigbee® or another suitable communication protocol). The example ATS 8 includes a receiver, such as the example smart grid enabled receiver 28, structured to communicate using serial communication messages 30,32 (e.g., without limitation, wireless serial communication messages using Zigbee®; wired power-line communication; another suitable wired or wireless communication protocol).

Example 1

When a serial communication message, such as 24, to load shed is received by the utility smart controller 22, it responsively commands the smart grid enabled receiver 28 using a serial communication message, such as 30, to cause the ATS 8 to start the second power source 6 (e.g., a generator) and transfer the number of loads 18 thereto. This action allows the first power source 4 (e.g., a utility) to shed loads, as needed, and also allows the end user to have power to all of the user's loads, as needed. Then, later, when the first power source 4 (e.g., a utility) sends another serial communication message, such as 26, to reapply the number of loads 18 to the utility grid (not shown), the smart grid enabled receiver 28 causes the ATS 8 to retransfer the number of loads 18 to the utility grid and shut down the second power source 6. In this example, the serial communication message 24 is a load shed message, and the serial communication message 26 is a reapply message. In response to the reapply serial communication message 26, the utility smart controller 22 responsively commands the smart grid enabled receiver 28 using a serial communication message, such as 32, to cause the ATS 8 to stop the second power source 6 (e.g., a generator) and transfer the number of loads 18 back to the first power source 4 by causing the transfer mechanism 16 to electrically connect only the first input 10 to the output 14.

Example 2

The serial communication messages 24,26 can be demand response load control (DRLC) messages or pricing signals. Load shedding may occur by one of two mechanisms: DRLC messages; and price signals that indicate that price is going over a certain threshold and based on a user-programmed rule engine (e.g., 131 of FIG. 8), the smart controller 22 can automatically kick-on a generator.

Example 3

Figure 2:
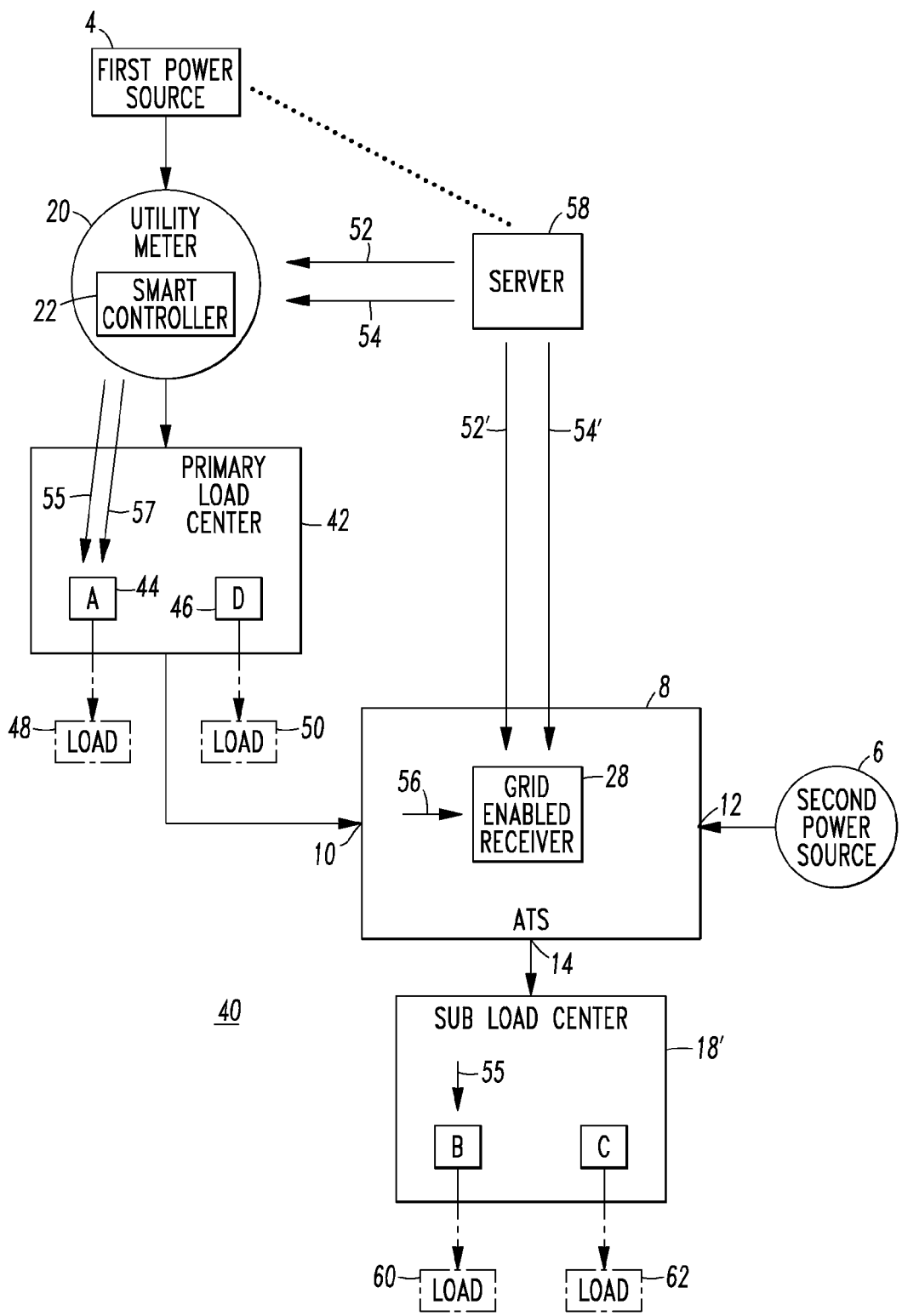

In FIG. 2, another power system, such as the example smart power system 40, is somewhat similar to the smart power system 2 of FIG. 1. Here, however, a primary load center 42 is powered by the utility meter 20, and a sub load center 18' is powered by the output 14 of the ATS 8. The primary load center 42 includes a number of circuit interrupters, such as the two example circuit breakers A 44 and D 46. Circuit breaker A 44 is a remote controlled circuit breaker (RCCB) or another suitable device that can control the flow of current to a corresponding load 48 (shown in phantom line drawing). The example RCCB A 44 is controlled by an external processor, such as the example smart controller 22. When a serial communication message, such as 52, from the utility grid (not shown) to shed the corresponding load 48 occurs, the smart controller 22 receives that serial communication message 52 and commands a number of corresponding RCCBs, such as RCCB A 44, to turn off using a number of other serial communication messages, such as 55. Also, when a serial communication message 54 from the utility grid to shed power is received, which power is less than power consumed by the load 48 powered by the RCCB A 44, only this RCCB is turned off by serial communication message 57 without losing power to other loads, such as load 50. Circuit breaker D 46 is not an RCCB and the corresponding load 50 will remain energized at all times unless it is opened or tripped, or unless there is a loss of power from the first power source 4.

Example 4

As shown in the example of FIG. 2, the first power source 4 includes a server 58 and the example utility meter 20 includes the example smart controller 22 structured to communicate with the server 58 and further structured to wirelessly communicate with the receiver 28 of the ATS 8 using serial communication messages, such as 56.

Example 5

The example smart controller 22 can be further structured to wirelessly communicate with the ATS receiver 28 employing a predetermined wireless protocol, such as Zigbee®.

Example 6

The example smart controller 22 can be structured to communicate with the server 58 employing one of power line carrier communication and wireless communication.

Example 7

As shown in FIG. 2, the output 14 of the ATS 8 includes a sub-panel, such as the example sub load center 18', for a plurality of non-essential loads, such as loads 60,62 (shown in phantom line drawing) powered by the second power source 6 when the receiver 28 receives the serial communication message 56 and causes the transfer mechanism 16 (shown in FIG. 1) to electrically connect only the second input 12 to the output 14.

Example 8

The second power source 6 can be a standby generator. A serial communication message 52' from the server 58 can be a load shed message. The receiver 28 can be structured to receive the load shed message 52' from the server 58 and responsively start the standby generator 6. The receiver 28 can be further structured to receive a reapply message 54' from the server 58, responsively stop the standby generator 6 and cause the transfer mechanism 16 (FIG. 1) to electrically connect only the first input 10 to the output 14.

Example 9

The serial communication messages 52,52' can be demand response load control (DRLC) messages from the server 58. Load shedding may occur by one of two mechanisms: DRLC messages; and price signals that indicate that price is going over a certain threshold and based on a user-programmed rule engine (e.g., 131 of FIG. 8), the smart controller 22 can automatically kick-on a generator.

Example 10

The plurality of non-essential loads 60,62 powered by the second power source 6 can be predetermined by the ATS 8, which is structured to enable the second power source 6 responsive to the serial communication message 52'. For example, these loads can be chosen by the end user as being those loads deemed critical (e.g., without limitation, refrigerators; lights; oxygen; heating). The loads can be hardwired by contractors and will always be powered by the generator if the utility power source is lost or a load shed signal is given.

Example 11

The sub load center 18' includes two example circuit breakers B and C. Circuit breaker B is an RCCB or another suitable device that can control the flow of current to the load 60 (shown in phantom line drawing). This example RCCB B 60 is controlled directly by an external processor, such as the example smart controller 22. When a serial communication message 52 from the utility grid (not shown) to shed the corresponding load 60 occurs, this RCCB B is turned off by serial communication message 55 from the controller 22. Alternatively, the RCCB B can respond directly to a serial communication message, such as 52', from the server 58. Circuit breaker C, in this example, is not an RCCB and it controls the flow of current to the corresponding load 62 (shown in phantom line drawing). If the amount of load required to be shed is more than that of the two example RCCBs B,C, then the ATS 8 is commanded to start the generator 6 and transfer all of the load (e.g., loads 60,62, as shown) contained in the sub load center 18'.

Example 12

Figure 3:
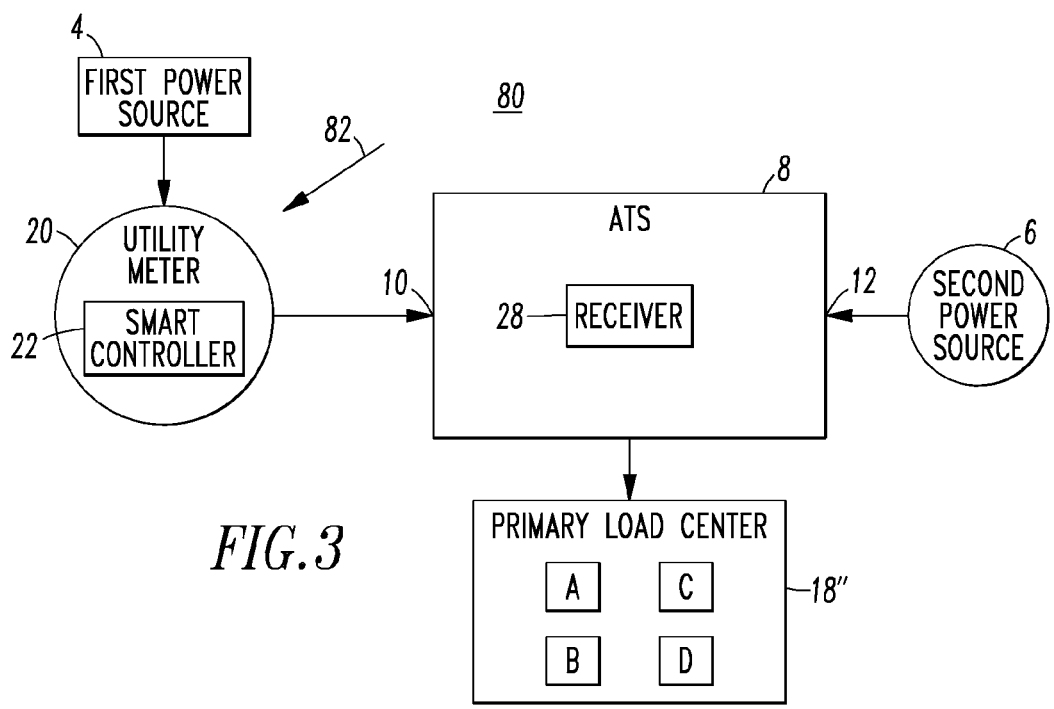

In FIG. 3, another power system, such as the example smart power system 80, is somewhat similar to the smart power system 2 of FIG. 1. Here, however, a primary load center 18" is powered by the ATS 8. The example primary load center 18" includes four example circuit breakers A, B, C and D. In this example, circuit breakers A, B and C are RCCBs or other suitable directly controlled devices that can control the flow of current to corresponding loads (not shown). As is conventional (e.g., for lighting control), these example RCCBs A,B,C are controlled directly by an external processor, such as the example smart controller 22. However, in this example, relatively larger loads, such as, for example and without limitation, hot water heaters, air conditioning units and pumps, can also be controlled. In this example, circuit breaker D is not an RCCB and the corresponding load (not shown) will normally remain energized at all times (e.g., power is available through the ATS 8 from the first power source 4 or from the second power source 6). If the amount of load controlled by RCCBs A,B,C is less than that required by serial communication message 82 (e.g., a load shed message), then the ATS 8 can be commanded by the smart controller 22 to start the second power source 6 (e.g., a generator) and transfer the entire primary load center 18" from the utility grid (not shown). Also, somewhat similar to a programmable thermostat (not shown) (e.g., without limitation, using hours of the day and days of the week for corresponding temperature settings), there may be times of the week that the end user does not want power removed from the loads (not shown) controlled by RCCBs A,B,C. In this case, the end user can override the control and choose to have the entire load (e.g., without limitation, the end user's whole house) transferred to the second power source 6.

Example 13

The number of loads controlled by RCCBs of the example primary load center 18" can be a predetermined number of a larger plurality of loads.

Example 14

The number of loads controlled by RCCBs of the example primary load center 18" can be all of a plurality of loads.

Example 15

Figure 4:
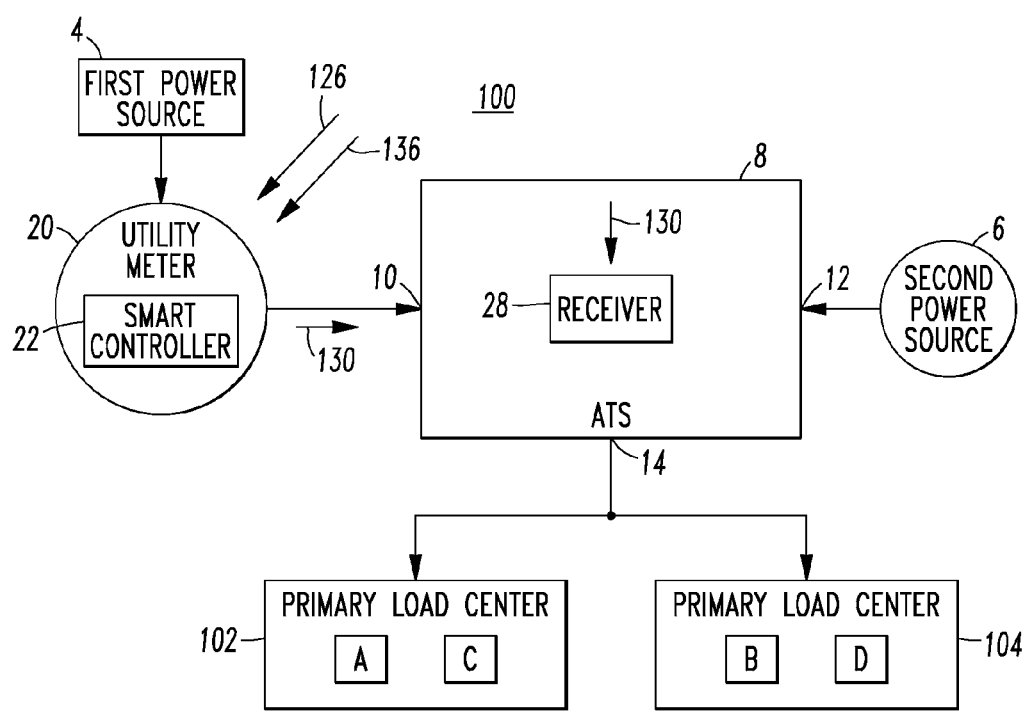

In FIG. 4, another power system, such as the example smart power system 100, is somewhat similar to the smart power system 2 of FIG. 1. Here, however, two primary load centers 102,104 are powered by the ATS output 14. For example and without limitation, in a typical 400 A service, the load is split into two 200 A primary load centers 102,104. This is typical of a relatively larger facility such as a relatively large home.

Example 16

Figure 5:
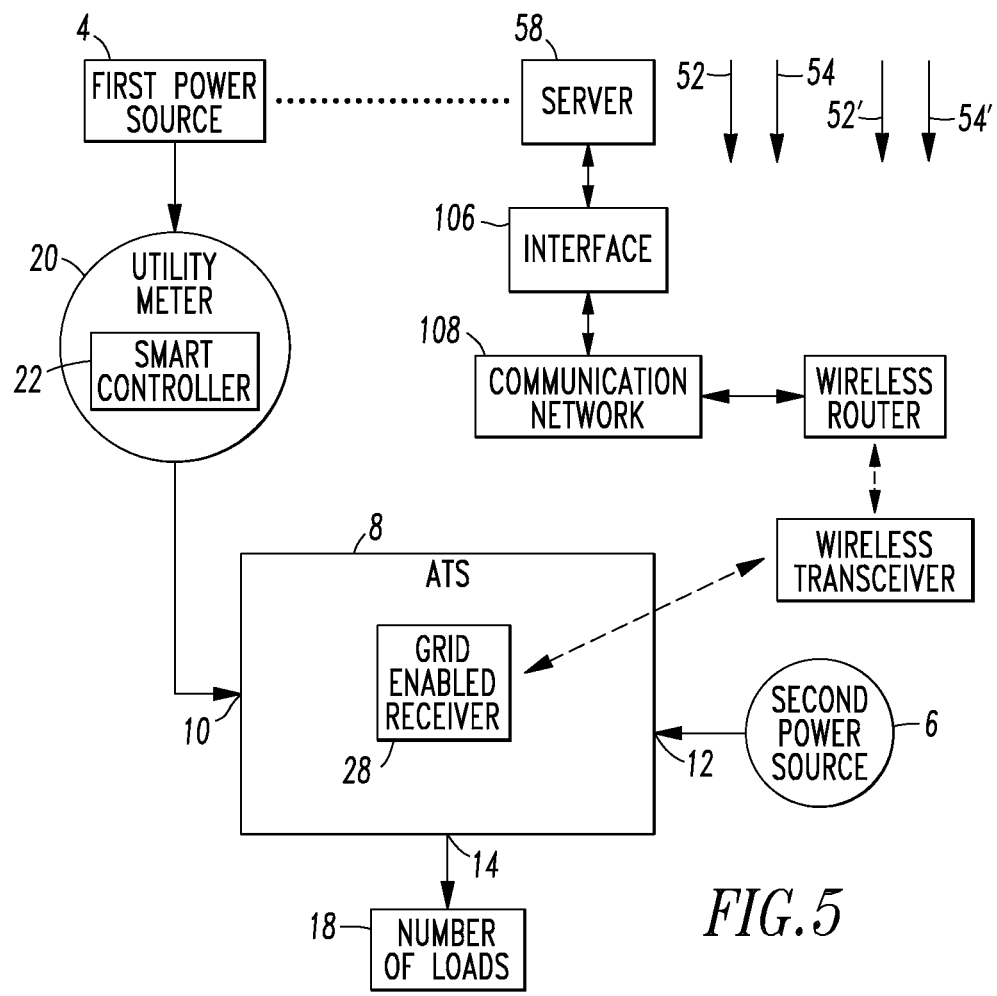

Referring to FIG. 5, the first power source 4 includes the server 58 and an interface 106 to a communication network 108. The ATS receiver 28 is structured to communicate with the communication network 108 employing a wireless transceiver 110 and a wireless router 112.

Example 17

Further to Example 16, the server 58 is structured to communicate with the ATS receiver 28 by employing a public network, such as the Internet, or a non-AMI (Advanced Metering Infrastructure) network, as the communication network 108. Here, the utility can bypass the utility smart meter 20 and its smart controller 22 and communicate directly with the smart grid enabled receiver 28. In this example, the utility 4 can use as the public communication network 108 to transmit to and receive from the smart grid enabled receiver 28 (e.g., through the example wireless router 112 at, for example and without limitation, a residence or an office). All of the example serial communication messages, such as 52,54,52', 54', could then be sent over this public network (with appropriate security). Otherwise, in an AMI network 114 (FIG. 6), which is a utility private network, the utility 4 deploys smart meters, such as 20, for communication.

Example 18

Figure 6:
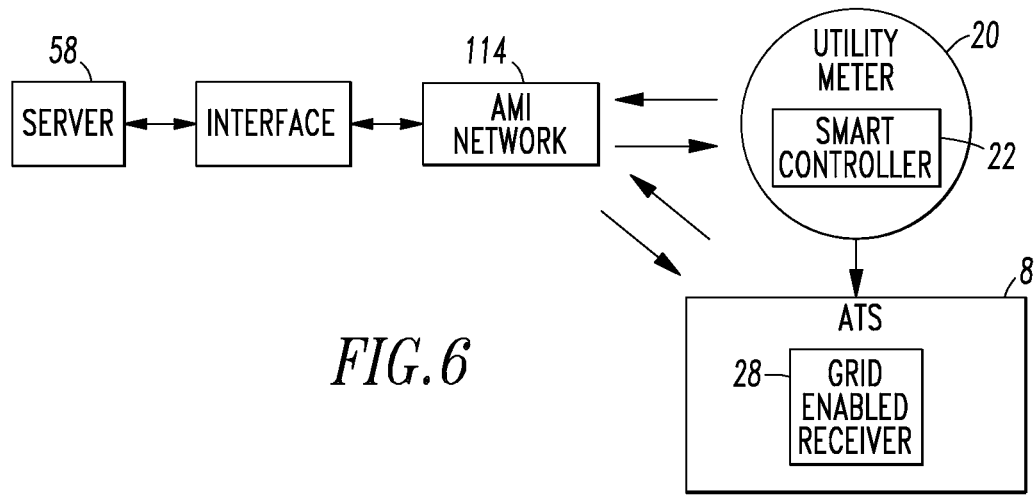

As shown in FIG. 6, the server 58 is structured to communicate with the receiver 28 and/or the smart controller 22 by employing an AMI network 114 as a communication network.

Example 19

Figure 7:
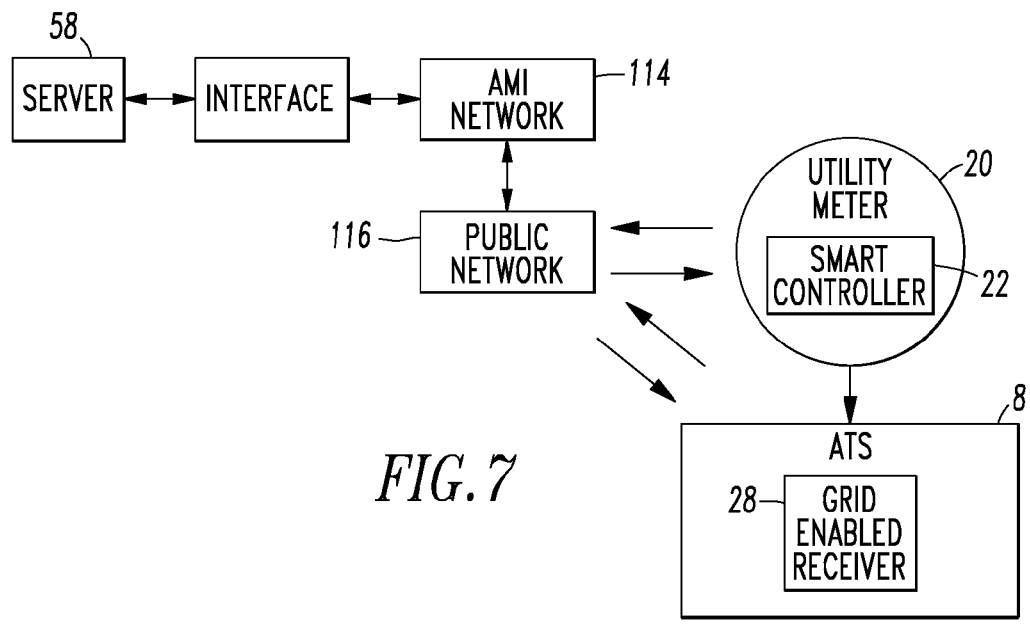

Referring to FIG. 7, the server 58 is structured to communicate with the receiver 28 and/or the smart controller 22 by employing a number of public and private networks 116,114. Here, any suitable combination of public networks (e.g., without limitation, the Internet) and private networks (e.g., without limitation, a utility backbone network to a plurality of utility meters) can be used for communication. In de-regulated markets, typically, the electricity retailer has a public network, such as 116, for two-way communication to smart grid enabled receivers, such as 28 (e.g., typically, economic Demand Response), and the owner of the distribution infrastructure (e.g., the electricity retailer) has a private network, such as 114, for two-way communication to smart grid enabled receivers, such as 28 (e.g., typically, grid stability related Demand Response).

Example 20

Figure 8:
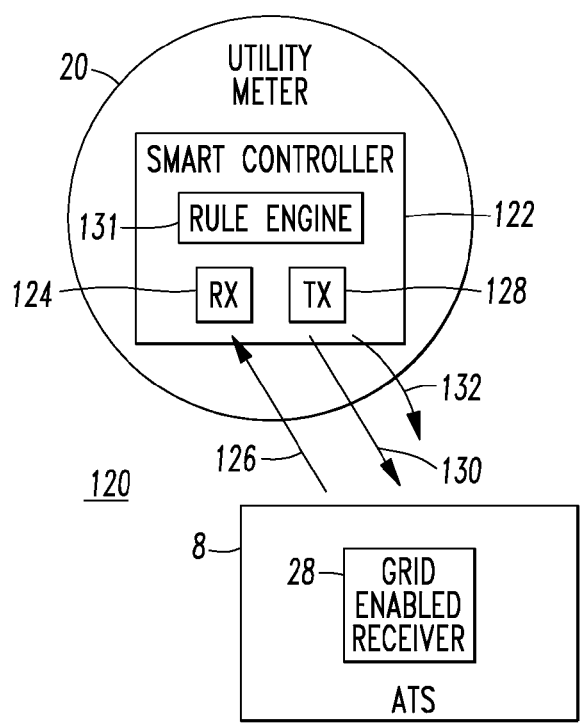

As shown in FIG. 8, a system, such as the example smart power system 120 is somewhat similar to the smart power system 2 of FIG. 1. The example smart power system 120 includes a controller 122 having a receiver (Rx) 124 structured to receive a serial communication message 126 and a transmitter (Tx) 128 structured to transmit the message 126 as another serial communication message 130. The ATS receiver 28 is structured to receive the serial communication message 130 from the transmitter 128 of the controller 122 and cause the transfer mechanism 16 (shown in FIG. 1) to electrically connect only the second input 12 (shown in FIG. 1) to the output 14 (shown in FIG. 1).

Example 21

The serial communication message 126 can be a directive based message affecting a number of the number of loads (such as the loads powered by circuit breakers A,B,C of FIGS. 2-4). The controller 122 can control a number of RCCBs, such as A,B,C, structured to selectively disable such loads.

Example 22

The serial communication message 126 can be an objective based message affecting a portion (e.g., a percentage) of power consumed by the number of loads (such as the loads powered by circuit breakers A,B,C of FIGS. 2-4). The controller 122 can include a rule engine 131 employing user-specified load profiles (preferences) and structured to identify a number of the number of loads to disable and further control a number of RCCBs A,B,C structured to selectively disable such number of loads.

Example 23

The disclosed concept allows, for example, a utility to shed a number of loads while allowing the end user to still have power to all of the user's loads. The disclosed concept can employ, for example, the smart grid controller 22, the ATS 8 with the ability to receive the serial communication message 126 (FIG. 8) from the "smart grid", and the standby generator 6 of FIG. 4. Depending on the size of the standby generator 6, an emergency sub-panel (not shown in FIG. 4, but see the sub load center 18' of FIG. 2) can be employed such that only specific loads are powered by the standby generator 6.

For example, during peak usage times, the utility 4 sends the serial communication message 126, via "smart grid", to shed all non-essential loads (e.g., without limitation, relatively large residential loads). The "smart grid" meter 20 of a corresponding residence receives this serial communication message 126 and then sends its own serial communication message 130 to shed loads. Instead of the individual loads of the residence being turned off by corresponding RCCBs controlled by the controller 22, the serial communication message 130 goes to the ATS 8. The ATS 8 receives the serial communication message 130 via the receiver 28 (e.g., a "smart grid" sensor that provides an input to the ATS 8). In response to that input, the ATS 8 starts the standby generator 6 and transfers the non-essential loads to the standby generator 6. The non-essential loads remain on the standby generator 6 until the utility sends another serial communication message 132 that allows the non-essential loads to return to the grid. When this happens, the ATS 8 retransfers the non-essential loads to the utility power source 4 and shuts down the standby generator 6.

The cost to run the standby generator 6 can be offset by avoidance of increased utility charges during peak times. There is also the potential for an individual to contract with the utility 4 to keep utility charges to a minimum if the utility is given the ability to provide the serial communication message 126 to shed non-essential loads from the utility grid. With the disclosed concept, the utility 4 is able to shed non-essential loads from the utility grid without interrupting the requirements of, for example, a residence. This is especially useful in, for example and without limitation, home offices, day care centers, or other residences or locations that employ relatively high energy demand loads due to, for example, equipment needs (e.g., without limitation, servers), legal requirements and/or illness.

Example 24

The disclosed concept can be employed, for example and without limitation, in residential, industrial and/or commercial applications.

Example 25

Examples of communications between the utility 4 and the smart controller 22 include: (1) meter interval data for billing purposes (from the utility meter 20 to the utility server 58 (FIG. 5) for storage in a database (not shown)); (2) pricing signals (from the utility server 58 to the utility meter 20); (3) demand response load control messages (from the utility server 58 to the utility meter 20); and (4) other serial communication messages that can be passed on to the power consumer (e.g., without limitation, notifications of future prices or events; advertisements; public service announcements) (from the utility server 58 to the utility meter 20).

Examples of communications between the smart controller 22 and the smart grid enabled receiver 28 include: (1) demand response load control messages from the smart utility meter 20 to the smart grid enabled receiver 28; and (2) pricing serial communication messages from the smart utility meter 20 to the smart grid enabled receiver 28. The physical medium can be, for example and without limitation, any suitable wireless communication medium, such as Zigbee® or another suitable RF communication medium.

Example 26

Demand Response Load Control (DRLC) messages can be directive based or objective based. For example and without limitation, a directive based message, such as "shed/turn off load x", or "increase central A/C temperature offset by y degrees F." can be sent. In this case, the smart grid enabled receiver 28 acts on the DRLC serial communication message. An objective based message, such as "shed total load by z %", may also be sent. In this case, the smart controller 122 uses the example rule engine 131 (FIG. 8) based on user-specified load profiles (preferences) to translate the objective into actions for specific loads. The rule engine 131 may reside at the smart controller 122 or at any other component of the system in the facility where loads have to be shed (e.g., without limitation, an in-home display and control device (not shown)). In this case, the smart controller 122 would be authorized to communicate with that rule engine to determine its own actions.

For both directive and objective based messages, the utility 4 wants to dump load from the utility grid (not shown). In one case, they want to dump as much as possible and in the other case they are more selective. In both cases, the ATS smart grid enabled receiver 28 receives the serial communication message 30 (FIG. 1) indicating that the utility 4 wants to remove load from the utility grid. The receiver 28 closes a contact (e.g., a latching relay type contact) (not shown), which is electrically connected to an ATS control input (not shown). When the contact is closed, the ATS 8 starts the generator 6 and transfers a number of loads to the generator. This accomplishes two things. First, it satisfies the utility's requirement to remove load from the utility grid. Second, it allows the end user to maintain power to all loads while keeping peak utility charges to a minimum.

Example 27

For example and without limitation, if the generator 6 is sized for a whole house, then the loads for the entire house are transferred to generator power. If the generator 6 is sized for a sub-panel (e.g., sub load center 18' of FIG. 2), then only those number of loads, such as 60, powered by the sub-panel are transferred to generator power.

Subsequently, when the utility 4 sends the serial communication message 26 (FIG. 1) to add load back to the utility grid, the ATS smart grid enabled receiver 28 receives that and opens the contact (not shown), which is electrically connected to the ATS control input (not shown). This causes the ATS 8 to reapply the number of loads (e.g., without limitation, loads for an entire house; a number of loads powered by a sub-panel) to the utility grid, and to cool down and shut off the generator 6.

Example 28

As another non-limiting example, the systems 40,80,100 of FIGS. 2-4 can provide flexibility. Here, if they are configured to allow the utility 4 to shut a number of loads down without sending a serial communication message to the ATS 8, then it can shed a number of individual loads as required by the utility 4 without allowing the ATS 8 to transfer those loads to the generator 6. This is the case if there is no standby generator.

If the utility 4 sends the serial communication message 52 of FIG. 2 to shed the particular load 48, then that load is turned off individually. This can be done with or without sending a serial communication message, such as 56, to the ATS 8 to shed the load to the generator 6. For example, the RCCB B is employed to control an individual load, such as 60. This allows the controller 22 to shed just those loads/circuits individually or to switch off multiple circuits to meet the required percentage decrease in load. Preferably, the end user can set priorities on a plurality of controllable loads such that the lowest priority is the load that is shed first until the required amount of load is shed.

Example 29

The disclosed concept enables the utility 4 to shed the number of loads 18 (FIG. 1) while the end user has power to all loads of interest. This is accomplished by the controller 22 telling the ATS 8 to start the generator 6 and transfer the number of loads 18 to the generator 6.

The following are three non-limiting examples of the Demand Response Load Control (DRLC) directive based message, and the DRLC objective based message, along with the specific actions by the ATS smart grid enabled receiver 28. This describes how the ATS 8 acts versus its sub load center 18' (FIG. 2) or primary load center 18" (FIG. 3) including a number of non-essential loads.

Referring to FIGS. 2 and 3 and Examples 30-32, there are three example predetermined loads controlled by RCCBs A,B,C of the primary load center 18" that consume 50 A out of a total 150 A utility service.

Example 30

The utility 4 sends a DRLC directive based message to shed load 60 (FIG. 2). Here, the ATS 8 is not involved and the controller 22 commands RCCB B for its corresponding load 60 to open.

Example 31

The utility 4 sends a DRLC objective based message to shed two-thirds of the total 150 A load. Here, the ATS 8 is involved. The receiver 28 closes the contact (not shown), which is electrically connected to the ATS control input (not shown). When the contact is closed, the ATS 8 starts the generator 6 and transfers the loads controlled by RCCBs A,B,C to the generator 6. This sheds one-third of the total 150 A utility service. The controller 22 determines (e.g., without limitation, based upon user priority settings; current values from current sensors; predetermined values from a look-up table) that loads E,F,G,H (not shown) are least essential and can provide the needed other one-third of the total 150 A utility service. Hence, the controller 22 tells RCCBs E,F,G,H (not shown) for loads E,F,G,H to open.

Example 32

The utility sends a DRLC directive based message to shed loads A,B. Here, the ATS 8 is involved. The receiver 28 closes the contact (not shown), which is electrically connected to the ATS control input (not shown). When the contact is closed, the ATS 8 starts the generator 6 and transfers loads controlled by RCCBs A,B,C (FIG. 3) to the generator 6.

Although example smart power systems 2,40,80,100,120 are shown, it will be appreciated that the disclosed concept is applicable to a wide range of different power distribution systems.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A power system comprising:
   a first power source provided by a utility, wherein the utility generates a first message and a second message in response to a determination by the utility that load shedding in the power system is needed;
   a second power source;
   a number of loads;
   a smart utility meter coupled to the first power source, wherein the first message is configured for receipt by the smart utility meter, and wherein the smart utility meter has a processor and is structured to receive the first message and generate and transmit a third message based on and in response to the first message; and
   an automatic transfer switch comprising:
      a first input structured to receive power from the first power source,
      a second input structured to receive power from the second power source,
      an output coupled to the number of loads, wherein the number of loads are structured to be powered by the output using the first power source during a non-load shedding condition of the first power source and using the second power source during a load shedding condition of the first power source,
      a transfer mechanism structured to selectively electrically connect either the first power source to the output through the first input or the second power source to the output through the first input in a manner wherein at any time only one of the first input or the second input may be electrically connected to the output at any time, and
      a receiver, wherein the second message and the third message are configured for receipt by the receiver, wherein the receiver is structured to: (i) receive the second message from the utility and responsive to receiving the second message cause said transfer mechanism to electrically connect only said second input to the output, and (ii) receive the third message from the smart utility meter and responsive to receiving the third message cause said transfer mechanism to electrically connect only said second input to the output.

2. The power system of claim 1 wherein said first, second and third messages are each a load shed message; and wherein the receiver is further structured to receive a reapply message and cause said transfer mechanism to electrically connect only said first input to the output, the reapply message being one of (i) a first reapply message generated by the utility in response to a determination by the utility that load shedding in the power system is no longer needed, and (ii) a second reapply message generated by the utility meter based on and in response to the first reapply message.

3. The power system of claim 1 wherein said processor is structured to wirelessly communicate with said receiver.

4. The power system of claim 3 wherein said processor is further structured to wirelessly communicate with said receiver employing a predetermined wireless protocol.

5. The power system of claim 3 wherein said processor is structured to communicate with the utility employing one of a power line carrier communication and a wireless communication.

6. The power system of claim 1 wherein said utility comprises a server and an interface to a communication network; and wherein said receiver is structured to communicate with the communication network employing a wireless transceiver and a wireless router to cause the second message to be communicated to the receiver.

7. The power system of claim 6 wherein said server is structured to communicate with said receiver by employing a public network.

8. The power system of claim 1 wherein the output of said automatic transfer switch is coupled to a sub-panel for the number of leads, wherein the number of loads are a plurality of non-essential loads powered by said second power source when said receiver receives said second or third message and causes said transfer mechanism to electrically connect only said second input to the output.

9. The power system of claim 1 wherein said second power source is a standby generator; wherein said utility comprises a server; wherein said first, second and third messages are each a load shed message; wherein the receiver is structured to receive the second message from said server and responsively start said standby generator; and wherein the receiver is further structured to receive a reapply message from said server, responsively stop said standby generator and cause said transfer mechanism to electrically connect only said first input to the output.

10. The power system of claim 1 wherein said utility comprises a server; and wherein said first second and third messages are each a demand response load control message from said server.

11. The power system of claim 1 wherein the output of said automatic transfer switch is coupled to a sub-panel for the number of leads, wherein the number of loads are a plurality of non-essential loads powered by said second power source.

12. The power system of claim 11 wherein said plurality of non-essential loads powered by said second power source are predetermined by said automatic transfer switch; and wherein said automatic transfer switch is structured to enable said second power source responsive to said second and third messages.

13. The power system of claim 1 wherein said number of loads is a predetermined number of a larger plurality of loads.

14. The power system of claim 1 wherein said number of loads is all of a plurality of loads.

15. The power system of claim 1 wherein said second power source is selected from the group consisting of a generator, an uninterruptible power source, a solar power source, and a wind power source.

16. The power system of claim 10 wherein said server is structured to communicate with said receiver by employing one of an AMI network and a non-AMI network.

17. The power system of claim 10 wherein said server is structured to communicate with said receiver by employing a number of public and private networks.

18. The power system of claim 1 wherein said first second and third messages are each a demand response load control message.

\* \* \* \* \*